United States Patent [19]

Okuno

[11] Patent Number: 4,923,043
[45] Date of Patent: May 8, 1990

[54] AIR COOLING SYSTEM FOR CLUTCH

[75] Inventor: Yoshihiro Okuno, Toyonaka, Japan

[73] Assignee: Kabushiki Kaisha Daikin Seisakusho, Osaka, Japan

[21] Appl. No.: 237,461

[22] Filed: Aug. 29, 1988

[30] Foreign Application Priority Data

Sep. 11, 1987 [JP] Japan ................. 62-229177

[51] Int. Cl.$^5$ ............................. F16D 13/72
[52] U.S. Cl. ..................... 192/70.12; 192/113 A
[58] Field of Search ............ 192/70.12, 113 R, 113 A; 188/71.6, 264 A, 264 AA

[56] References Cited

U.S. PATENT DOCUMENTS

| | | | |
|---|---|---|---|
| 1,742,804 | 1/1930 | Carhart | 192/113 A |
| 2,512,360 | 6/1950 | McLean | 192/113 A |
| 2,517,972 | 8/1950 | Cardwell et al. | 192/113 A |
| 3,002,597 | 10/1961 | Warman, Jr. et al. | 192/113 A |
| 4,382,497 | 5/1983 | Sakai et al. | 192/70.12 |
| 4,620,616 | 11/1986 | Martin | 188/264 AA |

*Primary Examiner*—Rodney H. Bonck
*Assistant Examiner*—Nicholas Whitelaw
*Attorney, Agent, or Firm*—Armstrong, Nikaido, Marmelstein, Kubovcik & Murray

[57] ABSTRACT

A first baffle plate is approximately annular and disc-like, and one side of the plate is close to and faces on an engine block side face of a flywheel and an outer periphery of the plate is close to and faces on an inner peripheral surface of a clutch housing. A second baffle plate is approximately annular and disc-like, and one side of the plate is close to and faces on an opposite-to-pressure-plate side face of a clutch cover and an outer periphery of the plate is close to and faces on the inner peripheral surface of the clutch housing. A through hole penetrating the flywheel in its axial direction is formed on the flywheel at a position around an inner periphery of the first baffle plate. There formed on the clutch housing a first air inlet port positioned nearer to the engine block side than the part fronting on the outer periphery of the first baffle plate, an air outlet port positioned between the part fronting on the outer periphery of the first baffle plate and the part fronting on the outer periphery of the second baffle plate, and a second air inlet port positioned nearer to a side opposite to the engine block than the part fronting on the outer periphery of the second baffle plate.

5 Claims, 3 Drawing Sheets

AIR COOLING SYSTEM FOR CLUTCH

BACKGROUND OF THE INVENTION

Industrial Useful Field

This invention relates to an air cooling system for a clutch.

Prior Art

It is generally known that a friction of clutch is proportional to a work volume.

A thermal energy generated in the clutch is decided by an equivalent moment of inertia I forming a load of clutch and a clutch engaging initial velocity Ω, and a generated quantity of heat Q is one-half the product of the moment of inertia I and a square of the clutch engaging initial velocity Ω.

On the other hand, a heat dissipation after engagement of clutch is decided by a difference between a temperature of clutch and a temperature of air contacting directly with the clutch, so that a cooling velocity of clutch is determined. Namely, the lower the outside temperature of clutch, the higher the cooling efficiency. This is the most important matter for cooling the clutch most efficiently.

Generally, the next engagement of clutch is done before the heat thereof is completely dissipated in vehicles frequently using the clutch such as a bus, a taxi, a delivery car, a collection-and-delivery car, a dust collecting car etc.; and fork lift trucks frequently operated and mostly used under a half-engaged state of clutch. Consequently, a temperature of clutch itself rises abruptly and a temperature of friction facing also rises with a rise of temperature in a clutch housing, so that a reducing tendency of friction coefficient of facing is strengthened as shown by FIG. 5 and at the same time a wear increases rapidly as shown by FIG. 6.

FIG. 4 is a sectional view of a conventional clutch used for a general vehicle. A clutch housing 51 is entirely enclosed so that a heat generated by a friction of a clutch disc 52 has been dissipated to atmosphere through the clutch housing 51 and air in the clutch housing 51. Namely, since the air in the clutch housing 51 is blown away toward an outer peripheral side when a rotation of engine causes a flywheel etc. to rotate at a high speed in the clutch housing 51, a pressure of an inner peripheral side lowers to naturally draw air from a central part. As the result, a convection flow occurs in the air in the clutch housing 51 as indicated by arrow shown by solid lines in FIG. 4. Thereby, the heat generated by the friction of the clutch disc 52 is transmitted to the clutch housing 51 through the air in the clutch housing 51, and dissipated to atmosphere as indicated by arrows shown by broken lines in FIG. 4. Incidentally, in FIG. 4, 54 & 55 are facings, 56 is a pressure plate, 57 is a diaphragm spring, 58 is a clutch cover, 59 is a release bearing, 60 is an engine output shaft, 61 is a clutch shaft and 62 is an engine block.

In such the conventional structure, however, since the air with raised temperature in the clutch housing 51 does not flow out of the clutch housing 51 but circulates within the clutch housing 51, the cooling efficiency is worsened and the clutch temperature is apt to rise. Therefore, disadvantages such as a deterioration of the friction coefficient and a propagation of wear have been encountered. Further, as seen from the arrows of solid lines in FIG. 4 showing the convection flow in the clutch housing 51, the clutch disc 52 is pushed toward the flywheel 53 side by the air drawn in the central part of the clutch disc 52. Therefore, there has been such a disadvantage that the clutch disc 52 has always remained on a surface of the flywheel 53 to cause a generation of drag torque.

SUMMARY OF THE INVENTION

Object of the Invention

An object of the invention is to provide an air cooling system for a clutch, which can cool the clutch efficiently and eliminate a drag torque.

Structure of the Invention

In order to accomplish the above object, the present invention provides a cooling system for a clutch wherein there provided an approximately disc-like first baffle plate one side face of which is close to and faces on an engine block side face of a flywheel and an outer periphery thereof is close to and faces on an inner peripheral surface of a clutch housing, and an approximately annular disc-like second baffle plate one side of which is close to and faces on an opposite-to-pressure-plate face of a clutch cover and an outer periphery thereof is close to and faces on the inner peripheral surface of said clutch housing; a through hole penetrating the flywheel in its axial direction is formed on said flywheel at a position around an inner periphery of said first baffle plate; there formed on said clutch housing a first air inlet port positioned nearer to said engine block side than the part fronting on the outer periphery of said first baffle plate, an air outlet port positioned between the part fronting on the outer periphery of said first baffle plate and the part fronting on the outer periphery of said second baffle, and a second air inlet port positioned nearer to a side opposite to said engine block than the part fronting on the outer periphery of said second baffle plate; thus forming a first air passage in which air flows from said first air inlet port through between said first baffle plate and said engine block and through a central hole of said first baffle plate to cool said flywheel and the clutch disc etc. and flows out of said air outlet port, and a second air passage in which air flows from said second air inlet port through between said second baffle plate and said clutch housing and through a center1 hole of said second baffle plate to cool said pressure plate and the clutch disc etc. and flows out of said air outlet port.

BRIEF DESCRIPTION ON THE DRAWINGS

DETAILED DESCRIPTION OF THE INVENTION

Embodiment 1

Figure 1:
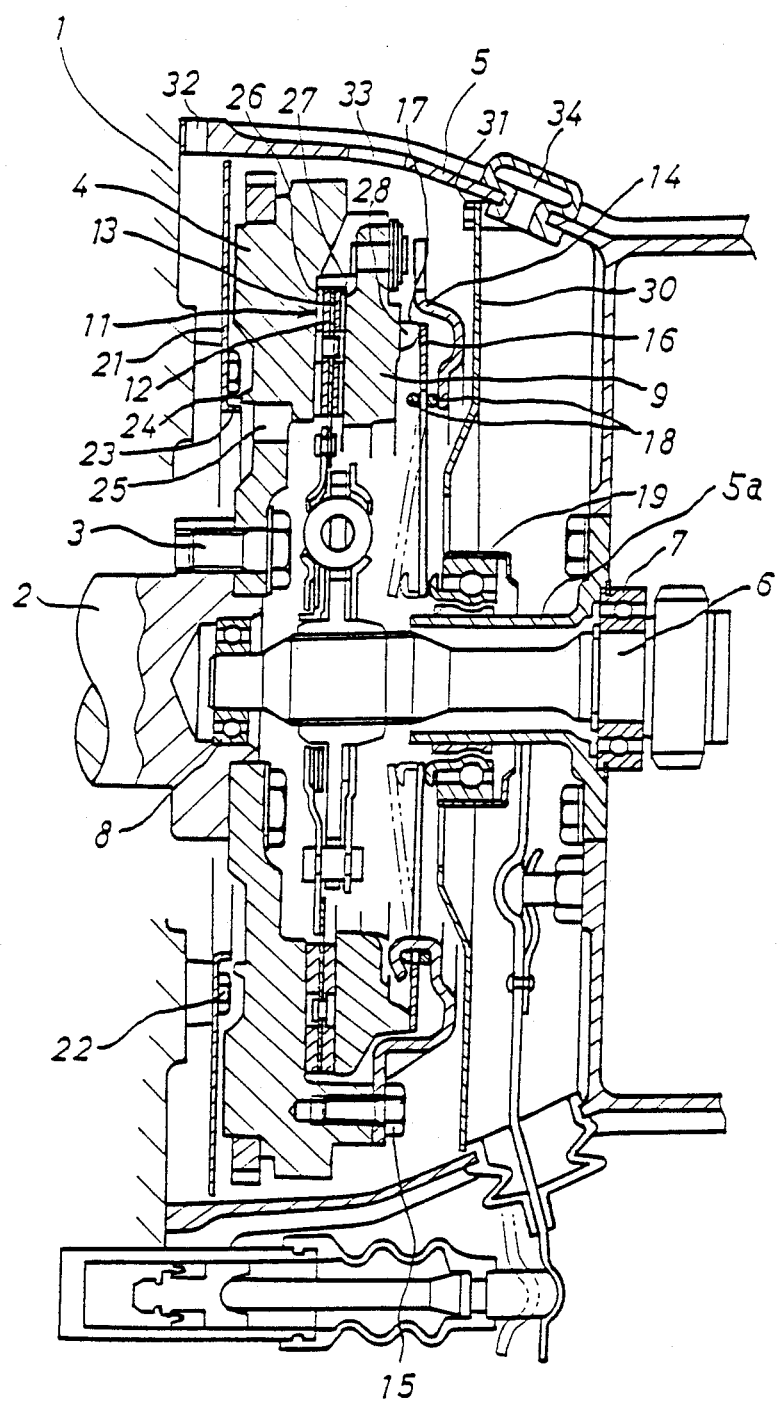
FIG. 1 is a sectional view of a clutch equipped with a cooling system of an embodiment according to the invention.

As illustrated by FIG. 1, an engine output shaft 2 is carried in an inside of an engine block 1 in a manner as rotatable freely around its axis. An annular flywheel 4 is secured to an outer peripheral part of one side of the output shaft 2 by plural bolts 3, and a clutch housing 5 covering the flywheel 4 is fastened to the engine block 1. A clutch shaft 6 an axis of which is coaxial with an axis of the output shaft 2 is disposed at a central part of the clutch housing 5, one end of the clutch shaft 6 is carried by a bearing 7 secured to the clutch housing 5 in a manner as rotatable freely around its axis, and the other end thereof is carried by a bearing 8 housed in one end of the output shaft 2 in a manner as rotatable freely around the axis. An outer peripheral part of an annular pressure plate 9 is supported by a face of the flywheel 4 opposite to the engine block 1 side in a freely sliding manner in the axial direction, and a clutch disc 11 is disposed between the pressure plate 9 and the flywheel 4. An inner peripheral part of the clutch disc 11 spline fits onto an outer peripheral part of the clutch shaft 6, and a facing 12 contacting with the flywheel 4 and a facing 13 contacting with the pressure plate 9 are provided on an outer peripheral part thereof. An annular clutch cover 14 is secured to the flywheel 4 by plural bolts 15, and the pressure plate 9 and the clutch disc 11 are covered by the flywheel 4 and the clutch cover 14. A conical diaphragm spring 16 is disposed in between the pressure plate 9 and the clutch cover 14, and an outer peripheral edge of the diaphragm spring 16 is in contact with an annular projection 17 provided integrally with and projectingly from the pressure plate 9. Further, the diaphragm spring 16 is held between a pair of wire rings 18 forming a load fulcrum point, and an inner peripheral part thereof is in contact with a release bearing 19. The pair of wire rings 18 are secured to the clutch cover 14, and the release bearing 19 fits onto an outer periphery of an inside cylindrical part 5a of the clutch housing 5 in a manner as sliding freely in the axial direction.

Between the engine block 1 and the flywheel 4, there disposed an approximately annular disc-like first baffle plate 21 one side of which is close to and faces on the flywheel 4 and an outer periphery thereof is close to and faces on an inner peripheral surface of the clutch housing 5. The first baffle plate 21 is secured to the engine block 1 by plural bolts 22. An annular projection 23 projecting toward the flywheel 4 side is provided on an inner peripheral edge of the first baffle plate 21, and an annular projection 24 positioned at a place radially slightly outer than the projection 23 is provided on a face of the flywheel 4 fronting on the first baffle plate 21. A distance between the projection 23 and the projection 24 is about 0.5~5 mm, and a distance between the frontingon faces of the first baffle plate 21 and the flywheel 4 is also about 0.5~5 mm. A through hole 25 penetrating the flywheel 4 in its axial direction is formed on the flywheel 4 at a position near to an inner periphery of the first baffle plate 21, plural radiating grooves 26 arranged in radial directions are formed on a surface of the facing 12 fronting on the flywheel 4, and plural radiating grooves 27 arranged in radial directions are formed on a surface of the facing 13 fronting on the pressure plate 9. Further, plural slits 28 arranged in radial directions are formed on the projection 17 of the pressure plate 9 with equal distances left therebetween in a circumferential direction. Between the clutch cover 14 and a side wall of the clutch housing 5, there disposed an approximately annular disc-like second baffle plate 30 one side of which is close to and faces on the clutch cover 14 and an outer periphery thereof is close to and faces on an inner peripheral surface of the clutch housing 5. The second baffle plate 30 is secured to the inner peripheral surface of the clutch housing 5 by plural bolts 31. A distance between the fronting-on faces of the second baffle plate 30 and the clutch cover 14 is about 0.5~5 mm.

A first air inlet port 32 is formed on the clutch housing 5 at a position nearer to the engine block 1 side than the fronting part on the first baffle palate 21, an air outlet port 33 is formed between the fronting part on the first baffle plate 21 and the fronting part on the second baffle plate 30, and a second air inlet port 34 is formed at a position nearer to the side wall of the clutch housing 5 than the fronting part on the second baffle plate 30, respectively. Plural first air inlet ports 22, plural air outlet ports 33 and plural second air inlet ports 34 are formed in respective places with appropriate distances left therebetween in the circumferential direction.

Figure 2:
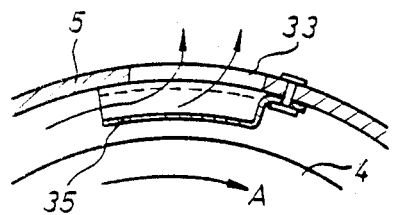
FIG. 2 is an enlarged sectional view in the region of an air outlet port.
Figure 3:
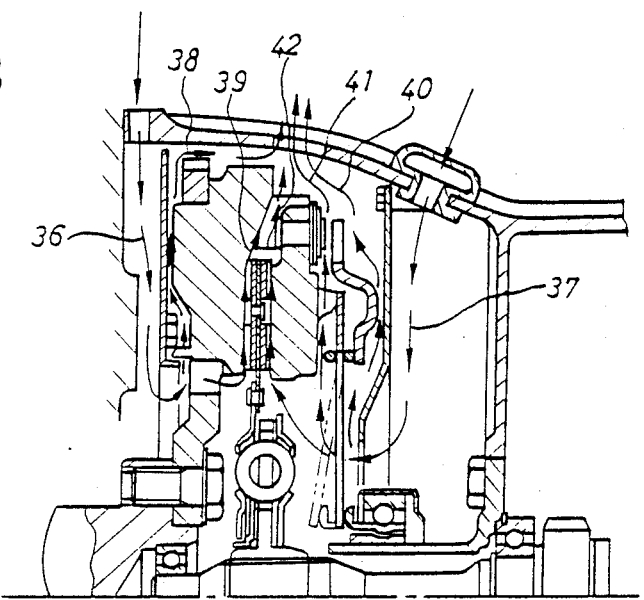
FIG. 3 is an explanatory view of an air passage.
Figure 5:
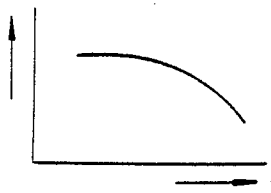
FIG. 5 is an explanatory diagram of a relation between a temperature and a friction coefficient for a facing.
Figure 6:
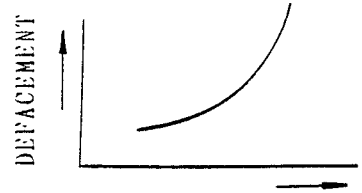
FIG. 6 is an explanatory diagram of a relation between a temperature and a wear amount for a facing.

Moreover, plural air guides 35 opening in an engine rotating direction indicated by an arrow A, i.e. an upstream side of a rotating direction of the flywheel 4, is formed on the inner peripheral surface of the clutch housing 5 in such a manner that they cover the air outlet ports 33 as illustrated in FIG. 2.

As seen from the above-mentioned structure; there formed in an inside of the clutch housing 5 a first air passage 36 in which air flows from the first air inlet port 32 through the first baffle plate 21 and the engine block 1 and through the central hole of the first baffle plate 21 to cool said flywheel 4 and the clutch disc 11 etc. and flows out of the air outlet port 33, and a second air passage 37 in which air flows from the second air inlet port 34 through between the second baffle plate 30 and the side wall of the clutch housing 5 and through the central hole of the second baffle plate 30 to cool the pressure plate 9 and the clutch disc 11 etc. and flows out of the air outlet port 33.

The first air passage 36 is branched into a first divided passage 38 passing from the central hole of the first baffle plate 21 through a clearance between the first baffle plate 21 and the flywheel 4 to the air outlet port 33, and a second divided passage 39 passing from the central hole of the first baffle plate 21 through the through hole 25 of the flywheel 4 and the radiating grooves 26 formed on the facing 12 and finally to the air outlet port 33. The second air passage 37 is branched into a third divided passage 40 passing from the central hole of the second baffle plate 30 through a clearance between the second baffle plate 30 and the clutch cover 14 and finally to the air outlet port, a fourth divided passage 41 passing from the central hole of the second baffle plate 30 through a slit of the diaphragm spring 16 and the slit 28 formed on the projection 17 of the pressure plate 9 and finally to the air outlet port 33, and a fifth divided passage 42 passing from the central hole of the second baffle plate 30 through the slit of the diaphragm spring 16 and the radiating grooves 27 formed on the facing 13 and finally to the air outlet port 33.

Function of the Invention

Function will be described hereunder. A rotation of the output shaft 2 brought about by an action of engine causes the flywheel 4, the pressure plate and the clutch cover 14 etc. to rotate, so that air between the first baffle plate 21 and the second baffle plate 30 is blown away toward the outer peripheral side. Thereby, the pressure of the inner peripheral side lowers and air at outside of the clutch housing 5 flows in from the first air inlet port 32 and the second air inlet port 34. The air flowing in from the first air inlet port 32 moves from between the engine block 1 and the first baffle plate 21 to a radial inside. A part of the air moves from between the baffle plate 21 and the flywheel 4 to a radial outside, and the remainder thereof moves by way of the through hole 25 formed on the flywheel 4 through the radiating grooves 26 formed on the face of the facing 12 of the clutch disc 11 fronting on the flywheel 4 and finally to the radial outside. In this instance, since the clearance between the first baffle plate 21 and the flywheel 4 is made so small as 0.5~5 mm and the clearance between the protrudingly provided projections 23 & 24 is also made so small as 0.5~5 mm, a quantity of air branched to the first divided passage 38 is limited so that a sufficient quantity of air flows even to the second divided passage 39. The friction surfaces of the flywheel 4 and the facing 12 of the clutch disc 11 are thoroughly cooled by the air flowing in the second divided passage 39 and at the same time wear particles accumulated in the radiating grooves 26 are blown away and cleaned. The flywheel 4 is further cooled by the air flowing through the first divided passage 38. Then, these airs flow from the air outlet port 33 to the outside of the clutch housing. On the other hand, air flowing in from the second air inlet port 34 moves from between the second baffle plate 30 and the side wall of the clutch housing 5 to the radial inside, and flows through the central hole of the second baffle plate 30. A part of the air moves through a clearance between the second baffle plate 30 and the clutch cover 14 to the radial outside, and remaining part of air moves through the slit of the diaphragm spring 16 and the clearance between the diaphragm spring 16 and the pressure plate 9 to the radial outside. It further moves through the slit 28 formed on the projection 17 of the pressure plate 9 and the clearance between the pressure plate 9 and the clutch cover 14, and the remainder thereof moves through the slit of the diaphragm spring 16 and the radiating grooves 27 formed on the facing 13 of the clutch disc 11 fronting on the pressure plate 9 and finally to the radial outside. In this instance, since the clearance between the second baffle plate 30 and the clutch cover 14 is made so small as 0.5~5 mm, a quantity of air branched to the third divided passage 40 is limited so that a sufficient quantity of air flows even to the fourth divided passage 41 and the fifth divided passage 42. The friction surfaces of the pressure plate 9 and the facing 13 of the clutch disc 11 are thoroughly cooled by the air flowing in the fifth divided passage 42 and at the same time wear particles accumulated in the radiating grooves 27 are blown away and cleaned. The pressure plate 9 is further cooled and at the same time the diaphragm spring 16 and the clutch cover 14 are cooled by the air flowing through the fourth divided passage 41. The clutch cover 14 is still further cooled by the air flowing through the third divided passage 40. Then, these airs flow from the air outlet port 33 to the outside of the clutch housing 5. In this instance, the air guides 35 are provided on the inner peripheral surface of the clutch housing 5, so that the air existing between the first baffle plate 21 and the second baffle plate 30 in the clutch housing 5 is forcedly discharged by the rotation of the flywheel 4 etc. from the air outlet port 33.

Incidentally, engagement and disengagement operations of the clutch are the same as those of an ordinary clutch and explanation thereof is omitted hereunder.

Figure 4:
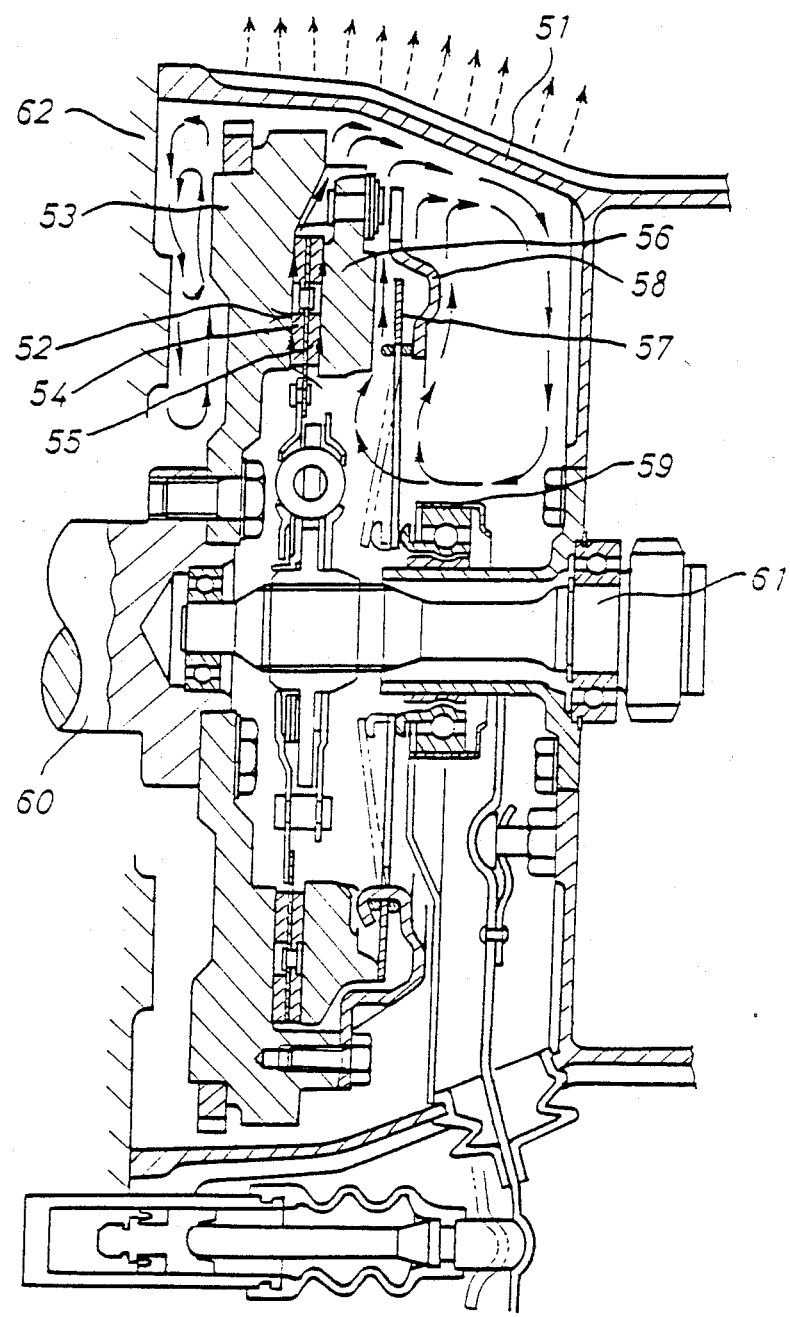
FIG. 4 is a sectional view of a conventional clutch.

As described above, the first baffle plate 21 and the second baffle plate 30 are provided; and the first air inlet port 32, the air outlet port 33 and the second air inlet port 34 are formed on the clutch housing 5, so that the inside of the clutch housing 5 can always be cooled with fresh air at outside of the clutch housing 5 by utilizing the rotation force of the flywheel 4 etc. Therefore, an extremely high cooling efficiency can be obtained and consequently temperature rises of the clutch disc 11 etc. can be controlled successfully. Accordingly, the reduction of friction coefficient and the propagation of wear of the facings 12 & 13 can be minimized, a performance of the clutch can always be maintained at a satisfactory level, and at the same time a service life of the clutch can be prolonged by a large margin. Further, the cooling air passing from the first air inlet port 32 to the through hole 25 of the flywheel 4 flows through the radiatity grooves 26 formed on the facing of the clutch disc 11 fronting on the flywheel 4. Therefore, the air pressure at the flywheel 4 side of the clutch disc 11 increases as compared with the conventional embodiment shown by FIG. 4, and consequently the drag torque can be eliminated, which has been generated due to the clutch disc 11 pushed onto the flywheel 4 by the cooling air. Moreover, the air guides 35 are attached to the clutch housing 5 in this embodiment, so that the air in the clutch housing 5 can be discharged forcedly from the air outlet port 33 by utilizing the rotation force of the flywheel 4 etc.

Incidentally, the explanation is made on the diaphrgm type clutch in this embodiment. However, the present invention is not limited to this type of clutch, but may be applicable to any type of clutch such as a coil spring type or a coil spring and diaphrgm spring type etc.

Effect of the Invention

As described above, according to the present invention, the inside of the clutch housing can always be cooled with fresh air at outside of the clutch housing by utilizing the rotation force of the flywheel etc., an extremely high cooling efficiency can be obtained and consequently the temperature rises of the clutch disc etc. can be controlled successfully. Accordingly, the reduction of friction coefficient and the propagation of wear of the facings 12 & 13 can be minimized, the performance of the clutch can always be maintained at a satisfactory level, and at the same time the service life of the clutch can be prolonged by a large margin. Further, the cooling air passing from the first air inlet port to the through hole of the flywheel flows through the radiating grooves formed on the facing of the clutch disc fronting on the flywheel. Therefore, the air pressure at the flywheel side of the clutch disc increases as compared with the conventional embodiment shown by FIG. 4, so that the drag torque can be eliminated, which has been generated due to the clutch disc pushed onto the flywheel by the cooling air.

What is claimed is:

1. A cooling system for a clutch mounted in a clutch housing for connecting and disconnecting a drive shaft mounted in an engine block with a driven shaft, said clutch housing being attached at one of its ends to an end of said block with an end of said drive shaft projecting into said housing, the other end of said housing supporting said driven shaft, a flywheel mounted on said end of said drive shaft in said engine end of said housing and spaced from said engine end of said housing for rotation in said housing, a pressure plate mounted on said flywheel on a side of said flywheel facing said other end of said housing for rotation in said housing with said flywheel and for axial movement toward and away from said flywheel, a clutch disc splined to said driven shaft and mounted between said flywheel and said pressure plate for engagement therewith, an approximately annular disc-like first baffle plate fixed to said end of said engine block and spaced therefrom between said end of said engine block and said flywheel, said first baffle plate having an outer periphery close to and facing on an inner peripheral surface of said clutch housing and an inner periphery spaced from said drive shaft, and an approximately annular disc-like second baffle plate fixed at its outer periphery to said clutch housing between said pressure plate and said other end of said clutch housing supporting said driven shaft, said second baffle plate having an outer periphery close to and facing on said inner peripheral surface of said clutch housing and an inner periphery spaced from said driven shaft; a hole penetrating through said flywheel in an axial direction and at a position in said flywheel at said inner periphery of said first baffle plate; a first air inlet port through said clutch housing between said engine block and said first baffle plate, an air outlet port through said clutch housing between said first baffle plate and said second baffle plate, and a second air inlet port through said clutch housing between said second baffle and said other end of said clutch housing supporting said driven shaft; said first air inlet port forming a first air passage for air flow through said first air inlet port, between said first baffle plate and said engine block, through a central hole between said inner periphery of said first baffle plate and said drive shaft and through said hole penetrating through said flywheel to said air outlet port for cooling said flywheel and said clutch disc, said second inlet port forming a second air passage for air flow through said second air inlet port, between said second baffle plate and said clutch housing and through a central hole between said inner periphery of said second baffle plate and said driven shaft for cooling said pressure plate and said clutch disc and for flowing out of said air outlet port.

2. A cooling system for a clutch as set forth in claim 1, in which said first and second air inlet ports and said air outlet port are formed in plural on said clutch housing with circumferential distances left therebetween.

3. A cooling system for a clutch as set forth in claim 1, in which a plurality of radiating grooves are formed in radial directions on the facing of said clutch disc.

4. A cooling system for a clutch as set forth in any one of claim 1 through claim 3, in which air guides opening in a direction opposite to a rotating direction of the flywheel are attached to an inner peripheral surface of said clutch housing and cover said air outlet ports.

5. A cooling system for a clutch as set forth in any one of claims 1 through 3, an annular projection projecting toward said flywheel side is provided on an inner peripheral edge of said first baffle plate, an annular projection positioned at a place radially slightly outer than the projection is provided on a face of said flywheel fronting on said first baffle plate, a distance between said two projections is about 0.5~5 mm, a distance between said first baffle plate and said flywheel is about 0.5~5 mm, and a distance between said second baffle plate and said clutch cover is about 0.5~5 mm.

* * * * *